United States Patent [19]

Henein et al.

[11] Patent Number: 4,627,275
[45] Date of Patent: Dec. 9, 1986

[54] ENGINE DEFICIENCY INDICATOR

[75] Inventors: Naeim A. Henein, Grosse Pointe Shores; Arun K. Sood, Southfield, both of Mich.

[73] Assignee: Wayne State University, Detroit, Mich.

[21] Appl. No.: 607,570

[22] Filed: May 7, 1984

[51] Int. Cl.$^4$ ............................................. G01M 15/00
[52] U.S. Cl. ........................................................ 73/112
[58] Field of Search ...................... 73/117.3, 112, 116; 364/551

[56] References Cited

U.S. PATENT DOCUMENTS

| | | | |
|---|---|---|---|
| 3,972,230 | 8/1976 | Hanson et al. | 73/116 |
| 4,015,467 | 4/1977 | Armstrong | 73/116 |
| 4,016,753 | 4/1977 | Willenbecher et al. | 73/116 |
| 4,061,026 | 12/1977 | Goodfriend et al. | 73/116 |
| 4,064,747 | 12/1977 | Rackliffe et al. | 73/116 |
| 4,179,922 | 12/1979 | Bouverie et al. | 73/116 |
| 4,295,363 | 10/1981 | Buck et al. | 73/117 |
| 4,337,647 | 7/1982 | Radcliffe et al. | 73/116 |
| 4,348,893 | 9/1982 | Hendrix et al. | 73/116 |
| 4,356,447 | 10/1982 | Hönig et al. | 324/169 |
| 4,418,388 | 11/1983 | Allgor et al. | 364/551 X |

Primary Examiner—Jerry W. Myracle
Attorney, Agent, or Firm—Basile, Weintraub & Hanlon

[57] ABSTRACT

An engine deficiency indicator includes a detector for detecting a pre-determined amount of angular rotation of an engine. The detector generates a first signal upon the start of one period of rotation of the engine which enables a counter for counting clock pulses. A second signal from the sensor, indicative of the completion of the pre-determined amount of angular rotation of the engine, disables the counter. A processing unit reads and stores the counter data in a memory. The counter data corresponds to the time required for the engine to rotate through a pre-determined amount of angular rotation. At the completion of a pre-determined number of engine rotational cycles, the processing unit analyzes the stored time sequence signals using a discrete Fourier transform analysis and/or an autocorrelation analysis to generate a manifestation of deficient engine operation. A display connected to the processing unit provides a visual or audible indication of efficient or deficient engine operation.

14 Claims, 3 Drawing Figures

ENGINE DEFICIENCY INDICATOR

BACKGROUND OF THE INVENTION

1. Field of the Invention

This invention relates, in general, to engine diagnostic devices and, more specifically, to engine diagnostic devices which detect malfunctions, such as deficient combustion, in the cylinders of an internal combustion engine.

2. Description of the Prior Art

A variety of engine diagnostic systems have been developed to diagnose the operating condition of an internal combustion engine. Such diagnostic systems have typically employed sensors mounted on an engine for detecting a pre-determined amount of angular rotation of a rotatable element of an engine, such as rotation of the crankshaft. Such angular positions are generally detected by sensing the passage of gear teeth of the flywheel ring gear past a sensor. The time interval between successive flywheel gear teeth is determined and then processed to provide a manifestation of an engine operating condition.

Systems utilizing such a measurement technique are disclosed in U.S. Pat. Nos. 4,015,467; 4,016,753 and 4,055,993. In the two former listed patents, speed measurements made while the engine is accelerating are processed to yield a starting speed, stopping speed and elapsed time measurements which can be utilized to provide torque and horsepower measurements for the engine. In the later patent, the measured time intervals during acceleration of the engine are processed to provide speed measurements of the engine itself.

In U.S. Pat. No. 4,055,993, speed measurements of an engine are determined by clocking the rotation of teeth on the flywheel of the engine. The time measurements for a pre-determined angular rotation to the flywheel are analyzed to provide speed measurements for the engine. In U.S. Pat. No. 4,348,893, an engine analysis detector is provided for determining the compression of an engine. The engine is compressed by means of cranking the engine without ignition. Changes in speed during the compression stroke of each cylinder are mathematically processed to yield values corresponding to the compression of each cylinder.

In U.S. Pat. No. 4,064,747, subcyclic speed measurements of an engine are made by detecting the difference between clock counts relative to each other to determine certain dynamic operating perameters of the engine. This detector may be used to determine relative power contribution of individual cylinders of the engine.

In U.S. Pat. No. 4,055,995, an engine diagnostic unit is disclosed which utilizes an acceleration burst between low and high engine speeds to provide horsepower measurements. Such measurements are compared with subsequent measurements to yield an indication of the amount of air in the fuel intake of the engine.

U.S. Pat. No. 3,972,230 discloses an apparatus and method of detecting uneven operation of individual cylinders in an engine. The engine is operated at any convenient idle speed and power cucle time periods between successive ignition times are measured. The deceleration rates between successive time periods are then computed along with the average deceleration rates for respective cylinders. Individual deceleration rates exceeding the average deceleration rate for a cylinder are detected to provide an indication of uneven cylinder operation.

The data acquisition unit disclosed in U.S. Pat. No. 4,179,922 measures successive crankshaft positions during engine rotation to provide a time duration between successive crankshaft positions. Time interval samples are generated and utilized to determine the existence of any cylinder malfunction.

U.S. Pat. No. 4,295,363 discloses an apparatus for diagnosing faults in the individual cylinders of an engine. Measurements corresponding to the time intervals between successive crankshaft positions are detected in at least one engine cycle. A comparison of a standard engine cycle with a subsequent engine cycle is made and a ratio of the standard with subsequent values as compared with a threshold to provide an output indicating the existence of a faulty condition such as low compression or low power of a particular cylinder.

In all of the previously disclosed engine diagnostic systems, the time interval measurements are taken during a pre-determined engine operating mode, such as acceleration, deceleration, idling, etc. Thus, diagnosis of the operating condition of the engine takes place in only a small portion of the total engine operating range and then only for a short period of time. As such, the previously disclosed methods for detecting engine malfunctions have not been totally accurate overall engine operating conditions.

Furthermore, such previously devised engine diagnosing systems have been relatively complex in configuration thereby resulting in a large sized diagnostic device which prevents its on-board use in a vehicle, such as an automobile, truck, etc. In addition, such previously devised engine diagnostic systems have been specifically devised for use with internal combustion engine in automobiles and trucks. Such diagnostic systems have not been employed, due to their limitations, in large size diesel and marine engines as well as internal combustion engines employed on aircraft and trains.

Thus, it would be desirable to provide an engine diagnostic system which overcomes the problems associated with previously devised diagnostic systems. It would also be desirable to provide engine diagnostic systems which is able to continuously monitor engine operation over a variety of engine operating conditions, such as idling, cruising, acceleration and deceleration. It would also be desirable to provide an engine diagnostic system which is simple in configuration and small in size so as to permit it to be installed directly in a vehicle for continuous monitoring of engine performance.

SUMMARY OF THE INVENTION

The present invention is an engine deficiency indicator which includes a sensor for detecting a pre-determined amount of angular rotation of an engine. The sensor is mounted in close association with any rotating component of the engine, such as the flywheel, crankshaft or cam shaft.

The sensor generates an electrical signal upon the start of one period of rotation of the engine which enables a counter to count clock pulses. A second signal from the sensor indicates completion of a pre-determined period of rotation of the engine. A processing unit, such as a micro-processor, controlling the operation of the indicator, reads and stores the counter output in memory. The counter output data corresponds to the time required for the engine to rotate through a pre-determined amount of angular rotation.

At the completion of a pre-determined number of engine cycles, the processing unit processes the stored time equivalent signals by using a discrete Fourier transform analysis or an autocorrelation analysis to generate a manifestation of engine condition. An indicator is connected to the processing unit and provides a visual or audible indication of the occurrence of an engine malfunction, such as deficient engine combustion in one or more of the cylinders of the engine.

A unique method for determining and indicating efficient engine operation is also disclosed. The present method includes the steps of:

A. Continuously detecting a pre-determined amount of angular rotation of an engine;

B. Continuously determining the time period for each pre-determined amount of engine rotation;

C. Mathematically processing the time period of each pre-determined amount of engine rotation;

D. Continuously generating a manifestation of deficient engine operation; and

E. Continuously indicating the occurrence of efficient engine operation.

The engine deficiency indicator and method of the present invention overcomes many of the problems associated with the previously devised engine diagnostic devices and methods insofar as providing a readily usable indication of the occurrence of an engine malfunction, such as deficient combustion in one or more of the engine cylinders. The engine deficiency indicator of the present invention makes unique use of certain analysis techniques which enable it to be used to monitor engine operation during all modes of engine performance, such as acceleration, deceleration, cruising and idling. As such, the engine deficiency indicator of the present invention may be employed to monitor engine performance continuously during any mode of operation of the vehicle and not just during selected modes, such as acceleration bursts, as with previously devised engine diagnostic systems.

Furthermore, the engine deficiency indicator of the present invention is relatively simple in configuration such that it can be constructed in a small size for on-board use on a vehicle, or with internal combustion engines employed on ships, trains, aircraft and the like. In addition, the engine deficiency indicator can be used with many different types of engines, as well as with both new and old engines thereby expanding its range of applications over engine diagnostic systems which were previously devised for use with only certain types of internal combustion engines.

For example, the engine deficiency indicator of the present invention may be used in any reciprocating combustion engine such as gasoline or diesel engines, as well as any land, sea or air vehicle to indicate the efficiency of deficiency of the engine operation.

One potential application of the engine deficiency indicator of the present invention is to adjust the fuel metered to each cylinder in a multi-cylinder engine in order to reduce the cylinder to cylinder variation in power production. This is particularly important in engines used in marine, stationary power plants and locomotive applications.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
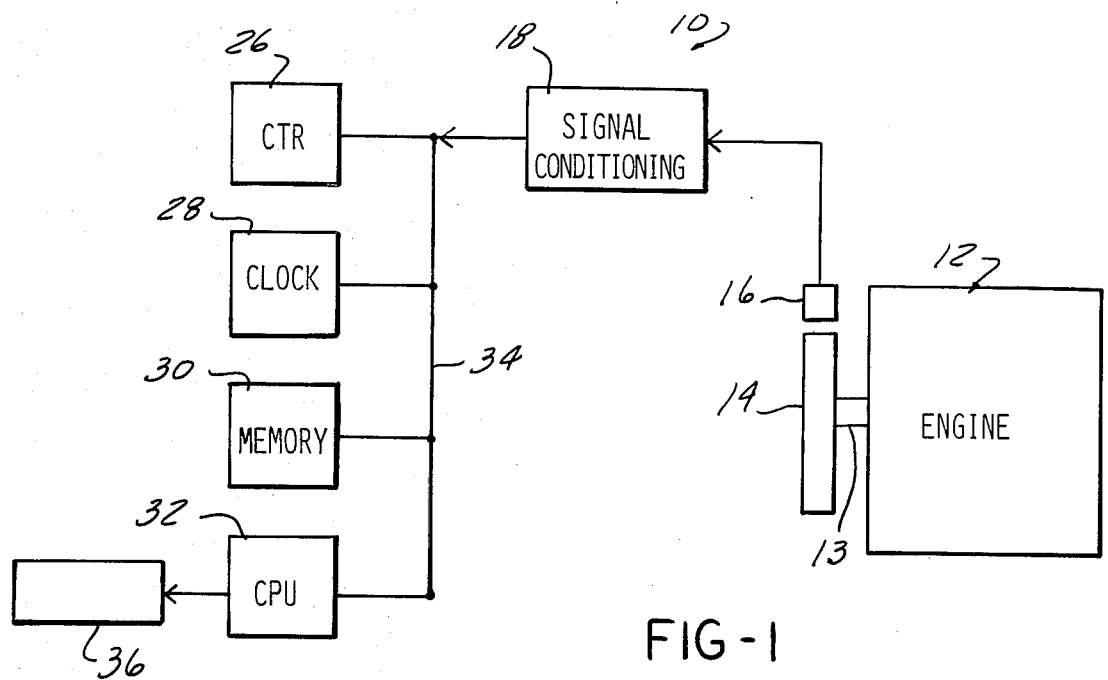
FIG. 1 is a block diagram of the engine deficiency indicator of the present invention.

Throughout the following description and drawing, an identical reference number is used to refer to the same component shown in the multiple figures of the drawing.

As shown in general in the drawing, the present invention is an engine deficiency indicator 10 which detects and indicates malfunctions, such as deficient combustion, in one or more of the cylinders of an internal combustion engine.

Figure 2:
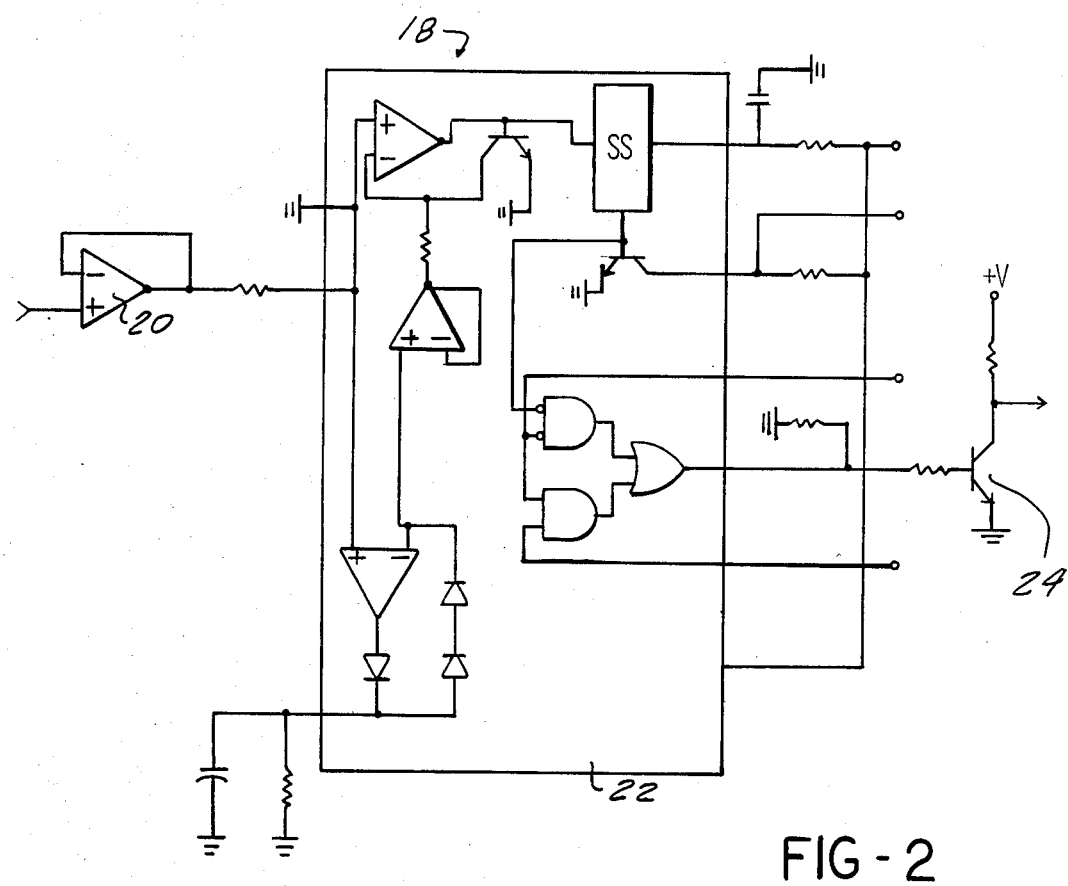
FIG. 2 is a circuit diagram of the signal conditioning block shown in FIG. 1.

As shown in greater detail in FIGS. 1 and 2, the engine deficiency indicator 10 of the present invention may be used with any internal combustion engine 12 which includes reciprocating pistons individually housed within a plurality of cylinders. The indicator 10 may be used with any type of engine, such as diesel, gasoline, etc., as well as in any type of vehicle, such as an automobile, truck, ship, aircraft, train, etc.

In providing output power, the engine 12 includes a rotatable member driven by the pistons. The rotatable member such as a crankshaft 13, rotates a pre-determined number of rotations per engine cycle. In addition to the crankshaft, other rotatable components of the engine 12 include the cam shaft, not shown, or a flywheel 14 mounted on the end of the crankshaft.

The indicator 10 includes means for detecting a pre-determined amount of angular rotation of the engine 12. As noted above, a pre-determined number, such as two revolutions in a four-stroke cycle engine or one revolution of a two-stroke cycle engine is required to complete one engine cycle. Thus, the engine 12 will rotate 720° during each cycle for a four-stroke cycle engine or 360° for a two-stroke cycle engine.

A sensor, denoted in general by reference number 16, is mounted on the engine 12 in close proximity with one of the rotatable components of the engine 12, such as the flywheel 14, the crankshaft 13 or the cam shaft. In an illustrative example, the sensor 16 is mounted in close proximity with the flywheel 14 and is operative to detect the passage of each gear tooth of the flywheel ring gear therepast. Alternately, the sensor 16 could be mounted adjacent to the crankshaft 13 or cam shaft to detect pre-determined angular amounts of rotation of these components of the engine 12.

In one embodiment, the sensor 16 comprises a magnetic pick-up, photo-electric cell, etc. which is mounted on the engine 12 adjacent to the flywheel 14. The sensor 16 detects the passage of each gear tooth of the flywheel 14 past the sensor 16 and generates a signal as each gear tooth passes the pick-up. Alternately, in place of the magnetic pick-up or photo-electric cell, the sensor may comprise an encoder which generates a signal upon the occurrence of a pre-determined amount of angular rotation of the engine 12.

The output signal from the sensor 16 is input to suitable signal conditioning circuitry, denoted in general by reference number 18 in FIG. 1 and shown in greater detail in FIG. 2. The signal conditioning circuitry includes a first amplifier 20 which acts as a buffer to isolate signals from the sensor 16 and the remaining signal conditioning circuitry. The output from the first amplifier 20 is input to an adaptive sensing amplifier 22 which converts the pulse output from the amplifier 20 into a rectangular wave signal. The adaptive sense amplifier may be any conventional sense amplifier such as the one sold commercially by National Semi-Conductor, Inc., under model number LM1815. The output from the sense amplifier 22 is input to the base electrode of a transistor 24. The transistor 24 acts as a buffer to isolate the sense amplifier 22 from the remaining circuitry of the indicator 10.

Referring again to FIG. 1, the output from the transistor 24 is input to a counter 26. The counter 26 is preferably of the type which includes counter circuitry as well as an internal holding register for temporarily storing count data during a subsequent counting period. A typical counter which could be used in the indicator 10 is one sold by Advanced Micro Devices under model number AM 9513. This device operates, when enabled, to count input pulses. At the completion of one count period, the count data is transferred to the holding register and the counter is reenabled for the next count period.

The remaining components of the indicator 10 include a clock 28, a memory 30 and a central processing unit 32. The counter 26, clock 28, memory 30 and the central processing unit 32 are interconnected by a conventional multi-connector bus 32 which provides parallel, bi-directional data and signal flow.

As shown in FIG. 1, the counter 26 receives, as an input, the output signal from the signal conditioning circuitry 18 which corresponds to a signal from the sensor 16 indicative of the completion of a pre-determined amount of angular rotation of the engine 12, as exemplified by the passage of one gear tooth of the flywheel 14 of the engine 12 past the sensor 16. This input signal enables or activates the counter 26 for counting. The counter 26 then counts clock pulses from the clock 28 at the clock frequency. In a preferred embodiment, a clock having a frequency 4 MHz was utilized although other frequencies may also be utilized.

The memory 30 may comprise any type of conventional read only and/or read/write memory. A read only memory may be used to store the control programs executed by the central processing unit 32. A read/write or RAM memory is used to temporarily store data generated during the operation of the indicator 10.

The central processing unit 32 may comprise any type of computer. Preferably a micro-processor is used to form a central processing unit 32 due to its small size and inexpensive cost.

Finally, the indicator 10 includes a display 36 which is driven by the central processing unit 32. The display 36 may comprise any type of conventional audible and-/or visual display indicator or alarm, such as a light, a CRT display, a buzzer, etc. The display 36 provides an indication of the occurrence of an engine malfunction.

Figure 3:
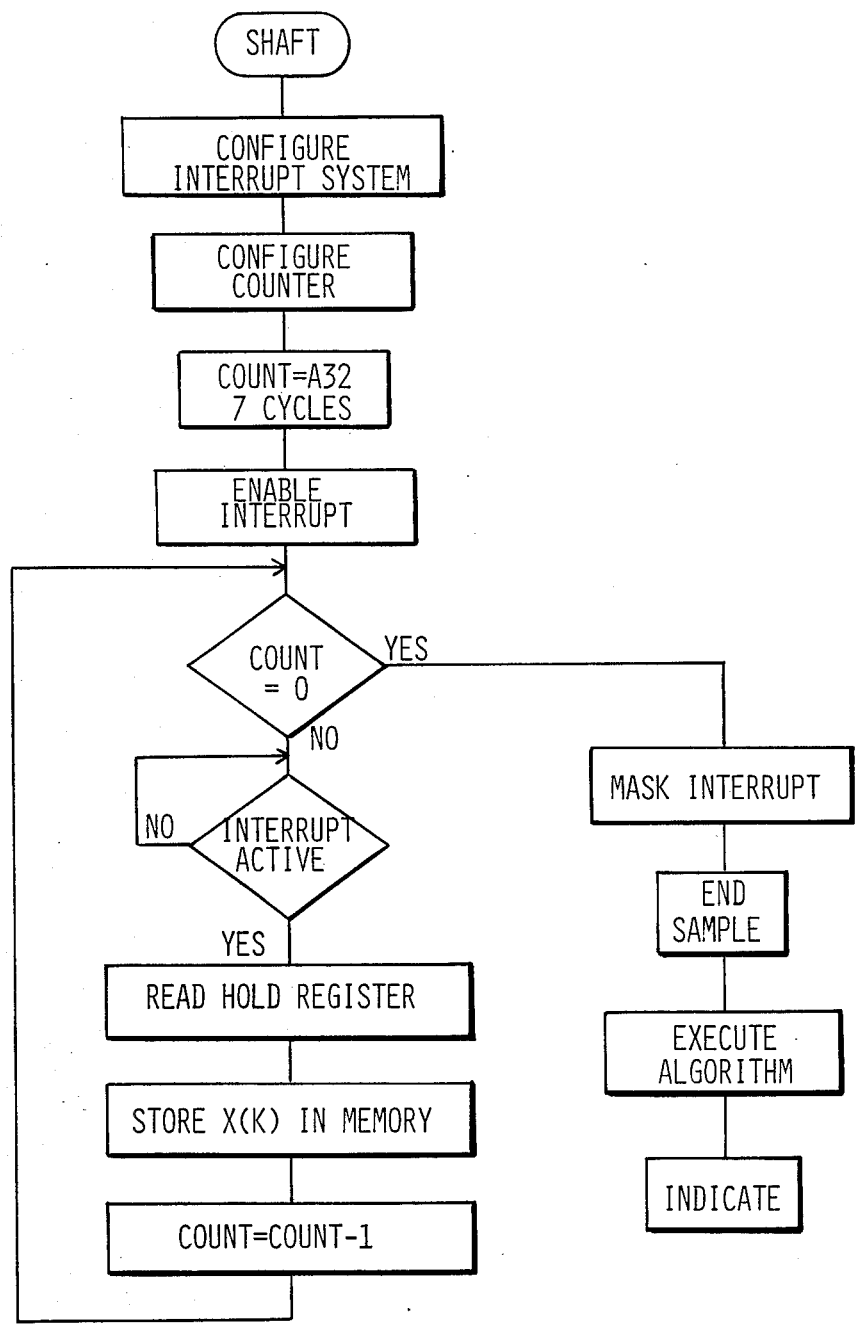
FIG. 3 is a flow chart illustrating the operation of the central processing unit.

The operation of the engine deficiency indicator 10 of the present invention in detecting an engine malfunction, such as a deficient engine combustion in one or more of the cylinders of the engine 12, will now be explained in conjunction with FIG. 3. In detecting an engine malfunction, the central processing unit 32 executes a first program stored in the memory 30. With the engine 12 operating in any mode, such as idling, under a pre-determined load and speed, or at no-load and at higher speeds, the central processing unit 32 executes the first stored program and initializes the interrupt and counter routines. The indicator 10 is initially programmed for a pre-determined number of samples. For example, if the flywheel 14 has 138 gear teeth and the engine 12 requires two revolutions to complete one engine cycle, the indicator 10 may be programmed to detect pulses over seven complete engine cycles for a total of 1932 separate signals. However, any sample size may be employed, with the larger sample sizes generally providing more accurate data.

The central processing unit 32 is interrupt driven, that is, processing of data will take place upon detecting an interrupt generated by a signal from the sensor 16 indicating the passage of one gear tooth of the flywheel 14 past the sensor 16.

Upon receiving a first signal from the sensor 16, the central processing unit 32 will go into an interrupt mode and enable the counter 26 to count pulses from the clock 28. Upon the occurrence of the next signal from the sensor 16, indicating the completion of a pre-determined amount of engine rotation as evidenced by the passage of the next gear tooth of the flywheel 14 past the sensor 16, the central processing unit 32 will process the stored count information. When the signal is received from the sensor 16, the stored count information is transferred to the internal holding register in the counter 26 and the counter is re-enabled for counting subsequent clock pulses.

The data stored in the counter 26, corresponding to the number of counted clock pulses during one pre-determined period of the engine rotation, is related to x(k) or the transisition time between two consecutive gear teeth on the flywheel 14. The central processing unit 32 reads the data in the holding register in the counter 26 and stores the data in the memory 30. At the completion of the total number of cycles, the central processing unit 32 will disable the interrupt and end execution of the first stored program in the memory 30.

The stored time sequence signals are related to the instantaneous angular velocity of the engine 12. Variations in the time signals and, therefore, the instantaneous angular velocity of the engine will vary during each period of angular rotation of the engine, depending upon the operating condition of the engine.

Upon completion of the pre-determined number of engine cycles, the stored data or times between consecutive gear teeth on the flywheel 14 is analyzed. A second program stored in the memory 30 is then executed by the central processing unit 32. Two preferred analysis procedures are described below by way of example and not limitation as other statistical and signal processing techniques may also be employed. Such analysis procedures include a discrete Fourier transform analysis of the time sequence signals and an autocorrelation analysis.

The discrete Fourier transform of the time-sequence signals x(k) is given by:

$$X(n) = \frac{1}{N} \sum_{k=0}^{N-1} X(k) e^{-2\pi i(kn/N)}, n = 0, 1, \ldots, N-1$$

where N is the number of samples.

The fundamental frequency of the discrete Fourier transform has been found to correspond to the engine cycle and the nth harmonic corresponds to the firing frequency of an engine with n cylinders. A distinction can be made between normal and faulty operation of the engine by considering various parameters, such as a ratio test where $R=X(l)/X(m)$ or a difference comparison $D=X(l)-X(m)$. Where m is related to the number of cylinders in the engine. It is possible to define ranges for the ratio and difference comparison tests corresponding to faulty and health engine operations. For example, data utilizing the above analysis procedure suggests that a ratio greater than one or a difference greater than zero indicates faulty engine operation; that is, a malfunction, such as deficient engine combustion, in one of the cylinders of the engine.

The central processing unit 32 may be programmed for such ranges to thereby generate a signal to activate the display 36 and provide an indication of the engine efficiency or a deficiency caused by an engine malfunction.

An alternate analysis procedure is termed "autocorrelation" and is defined as follows:

$$AC(\tau) = \frac{1}{N} \cdot \frac{1}{VAR} \sum_{k=0}^{N-1} (X(k) - \text{MEAN})(X(k+\tau) - \text{MEAN})$$

$$\tau = 0, 1, \ldots, N-1$$

where N is the number of samples in an engine cycle and MEAN and VAR are the mean and variance of samples equal to, respectively:

$$\text{MEAN} = \frac{1}{N} \sum_{k=0}^{N-1} X(k) \quad \text{VAR} = \frac{1}{N} \sum_{k=0}^{N-1} (X(k) - \text{MEAN})^2$$

It has been found that in a healthy or properly functioning engine, all maxima for $\lambda$ greater than zero are about at the same level or value. On the other hand, the envelope for a faulty engine is a montonically decreasing function. In the above example of a flywheel having 138 gear teeth, the autocorrelation need only be calculated for $\{AC(\lambda)\lambda=46, 92 \text{ and } 138\}$. Obviously, an engine having a difference number of cylinders or a flywheel with a different number of gear teeth with utilize different maxima values. Using this autocorrelation analysis, the central processing unit 32 can detect the occurrence of a decreasing maxima function and provide an indication to the display 36 of the engine efficiency or deficiency caused by the occurrence of an engine malfunction in one or more cylinders of the engine.

The second stored program may include both of the above-identified analysis procedures so as to execute a discrete Fourier transform or an autocorrelation analysis on the stored time interval signals and, if a malifestation of deficient engine operation is detected, will execute the other analysis procedure on the time interval signals to confirm the manisfestation of deficient engine operation. This multiple analysis can be done automatically by the second stored program or can be activated by means of switches controlled by the operator of the vehicle or engine to perform the second test when desired.

In summary, there has been disclosed an unique engine deficiency indicator which provides an indication of the engine efficiency or deficiency caused by the occurrence of an engine malfunction, such as deficient engine combustion in one or more of the cylinders of an internal combustion engine. The indicator includes a minimal number of component for a low manufacturing cost and may be constructed in a relatively small size so as to be employed directly on a vehicle for continuous monitoring of engine performance.

What is claimed is:

1. An apparatus for indicating deficient engine operation comprising:
   means for continuously detecting a pre-determined amount of angular rotation of a rotatable component of an engine;
   means, responsive to the detecting means, for continuously determining the time period of each pre-determined amount of engine rotation;
   processing means, responsive to the determining means, for continuously generating a manifestation of engine efficiency and deficiency based on each time period; and
   display means, responsive to the processing means, for continuously indicating the efficiency or deficiency of engine operation.

2. The apparatus of claim 1 wherein the detecting means comprises:
   means for detecting a pre-determined amount of angular rotation of a rotatable component of the engine.

3. The apparatus of claim 2 wherein:
   the rotatable engine component is the engine flywheel having a plurality of circumferentially spaced gear teeth; and
   the detecting means detects the passage of each flywheel gear tooth past the detecting means.

4. The apparatus of claim 1 wherein the determining means comprises:
   a counter having an input; and
   a clock, the clock connected to the input of the counter;
   the output of the detecting means enables the counter once for each pre-determined amount of engine rotation, the counter storing a count equivalent to the time period of each pre-determined amount of engine rotation.

5. The apparatus of claim 4 wherein the processing means includes;
   first stored program means for computing the time period of each pre-determined amount of engine rotation.

6. The apparatus of claim 5 wherein the processing means includes;
   second stored program means for computing a manifestation of efficient or deficient engine operation, the processing means activating the display means upon computing a manifestation of efficient or deficient engine operation.

7. An apparatus
   for indicating deficient engine operation comprising:
   means for continuously detecting a predetermined amount of angular rotation of an engine;
   means responsive to the detecting means, for continuously determining the time period of each pre-determined amount of engine rotation, the determining means including:
   a counter having an input; and a clock, the clock connected to the input of the counter; the output of the detecting means enables the counter once for each pre-determined amount of engine rotation, the counter storing a count equivalent to the time period of each pre-determined amount of engine rotation;
   processing means, responsive to the determining means, for continuously generating a manifestation of engine efficiency and deficiency, the processing means including first stored program means for computing the time period of each pre-determined amount of engine rotation and second stored program means for computing a manifestation of efficient or deficient engine operation, the processing means activating the display means upon computing a manifestation of efficient or deficient engine operation; and the second stored program computing the discrete Fourier transform of the time periods, display means reponsive to the processing means, for continuously indicating the efficiency or deficiency of engine operation.

8. An apparatus for indicating deficient engine operation comprising:

means for continuously detecting a predetermined amount of angular rotation of an engine;

means responsive to the detecting means, for continuously determining the time period of each pre-determined amount of engine rotation, the determining means including:

a counter having an input; and a clock, the clock connected to the input of the counter; the output of the detecting means enables the counter once for each pre-determined amount of engine rotation, the counter storing a count equivalent to the time period of each pre-determined amount of engine rotation;

processing means, responsive to the determining means, for continuously generating a manifestation of engine efficiency and deficiency, the processing means including first stored program means for computing the time period of each pre-determined amount of engine rotation and second stored program means of computing a manifestation of efficient or deficient engine operation, the processing means activating the display means upon computing a manifestation of efficient or deficient engine operation; and the second stored program computing the auto-correlation of the time periods, display means responsive to the processing means, for continuously indicating the efficiency or deficiency of engine operation.

9. An apparatus for indicating deficient engine operation comprising:

means for continuously detecting a predetermined amount of angular rotation of an engine;

means responsive to the detecting means, for continuously determining the time period of each pre-determined amount of engine rotation, the determining means including:

a counter having an input; and a clock, the clock connected to the input of the counter; the output of the detecting means enables the counter once for each pre-determined amount of engine rotation, the counter storing a count equivalent to the time period of each pre-determined amount of engine rotation;

processing means, responsive to the determining means, for continuously generating a manifestation of engine efficiency and deficiency, the processing means including first stored program means for computing the time period of each pre-determined amount of engine rotation and second stored program means for computing a manifestation of efficient or deficient engine operation, the processing means activating the display means upon computing a manifestation of efficient or deficient engine operation; and the second stored program computing the discrete Fourier transform and the auto-correlation of the time periods, display means responsive to the processing means, for continuously indicating the efficiency or deficiency of engine operation.

10. A method for determining and indicating deficient engine operation comprising the steps of:

continuously detecting a pre-determined amount of angular rotation of an engine;

continuously determining the time period of each pre-determined amount of engine rotation;

mathematically processing the time period of each pre-determined amount of engine rotation based on each time period;

continuously generating a manifestation of efficiency and deficiency of the engine; and continuously indicating the efficiency and deficiency caused by the occurrence of a fault in the engine operation.

11. A method for determining and indicating deficient engine operation comprising the steps of:

continuously detecting a pre-determined amount of angular rotation of an engine;

continuously determining the time period of each pre-determined amount of engine rotation;

mathematically processing the time period of each pre-determined amount of engine rotation including calculating the discrete Fourier transform of the time periods for each pre-determined amount of engine rotation according to:

$$X(n) = \frac{1}{N} \sum_{k=0}^{N-1} X(k)e^{-2\pi i(kn/N)}, n = 0, 1, \ldots, N-1$$

continuously generating a manifestation of efficiency and deficiency of the engine; and continuously indicating the efficiency and deficiency caused by the occurrence of a fault in the engine operation.

12. The method claim 11 further including the steps of performing a ratio test according to $R=x(l)/x(n)$ on the discrete Fourier transform values.

13. The mehtod of claim 11 further including the step of calculating a difference test according to $D=X(l)-X(n)$ on the discrete Fourier transform values.

14. A method for determining and indicating deficient engine operation comprising the steps of:

continuously detecting a pre-determined amount of angular rotation of an engine;

continuously determining the time period of each pre-determined amount of engine rotation;

mathematically processing the time period of each pre-determined amount of engine rotation, including the step of calculating an auto-correlation according to:

$$AC(\tau) = \frac{1}{N} \cdot \frac{1}{VAR} \sum_{k=0}^{N-1} (X(k) - \text{MEAN})(X(k+\tau) - \text{MEAN})$$

$$\tau = 0, 1, \ldots, N-1$$

where N is the number of samples in an engine cycle and MEAN and VAR are the mean and variance of samples equal to, respectively:

$$\text{MEAN} = \frac{1}{N} \sum_{k=0}^{N-1} X(k) \qquad \text{VAR} = \frac{1}{N} \sum_{k=0}^{N-1} (X(k) - \text{MEAN})^2$$

continuously generating a manifestation of engine efficiency and deficiency; and continuously indicating the efficiency and deficiency caused by the occurrence of a fault in the engine operation.

* * * * *